Patented Dec. 15, 1931

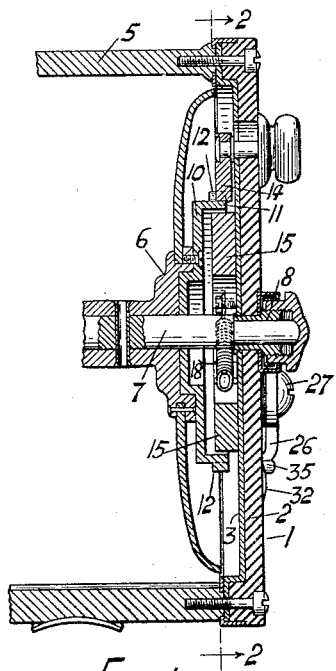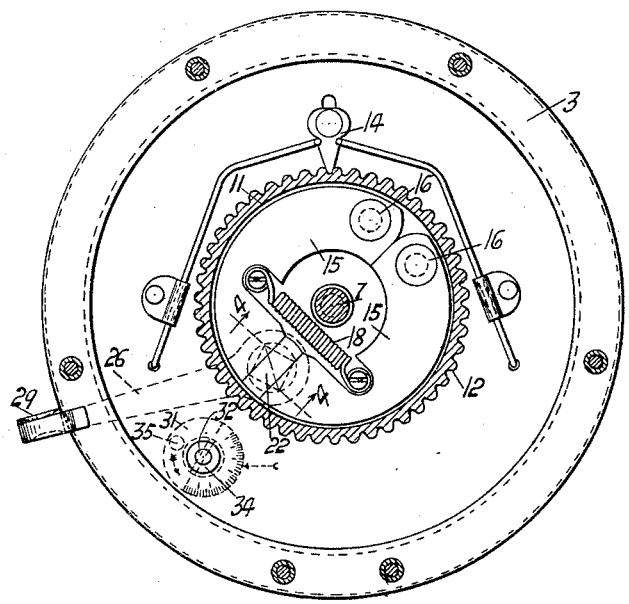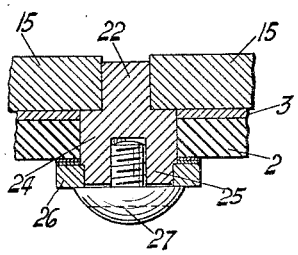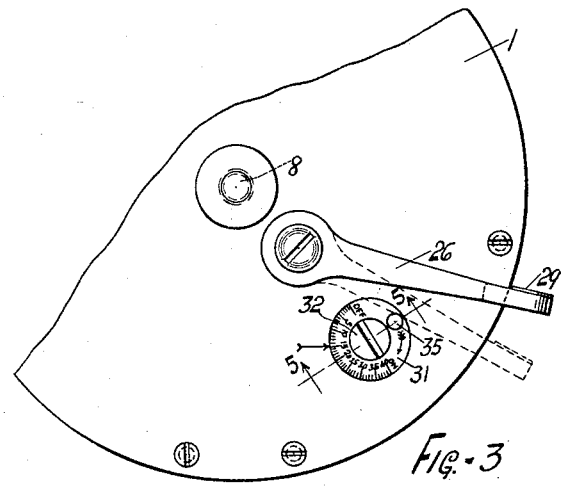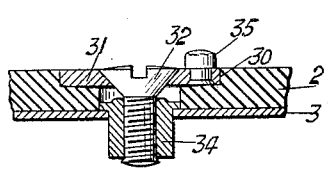

1,836,869

UNITED STATES PATENT OFFICE

CHARLES T. PFLUEGER AND WALTER L. ADAMS, OF AKRON, OHIO, ASSIGNORS TO THE ENTERPRISE MANUFACTURING COMPANY, OF AKRON, OHIO, A CORPORATION OF OHIO

FISHING REEL

Application filed February 1, 1929. Serial No. 336,869.

The present invention relates to fishing reels and particularly to that type of reel adapted for use in catching large, salt water fish.

The object of the present invention is to improve upon the brake mechanism used on this form of reel and particularly upon the form of salt water reel shown in the application of Charles T. Pflueger and Walter L. Adams, Serial No. 209,493, filed July 30, 1927. In the application above referred to and as shown herein, a new and novel form of reel brake mechanism is shown, whereby a powerful braking effect can be exerted upon the spool. The object of the present invention is to combine with that form of brake mechanism, an adjustable stop for regulating and limiting the amount of braking force to be applied to the spool and thence to the line.

With a powerful braking mechanism such as shown and described herein, it is possible to exert sufficient force upon the spool to break the line, and the provision of a simple and easily regulated stop mechanism is an added element of safety to the construction.

In the drawings, there is reproduced so much of the reel structure as is necessary to acquire a complete understanding of the invention, which includes the construction of the brake mechanism and the adjustable stop.

In the drawings:

Figure 1 is a sectional view of the end of a reel structure in which the improved brake mechanism is housed;

Figure 2 is a section thereof on the line 2—2 of Figure 1;

Figure 3 is a detail view looking at a fragment of the end plate of the reel showing the adjustable stop device thereon;

Figure 4 is a detail section, enlarged, on the line 4—4 of Figure 2 showing the method of mounting the brake lever; and Figure 5 is an enlarged detail section of the adjustable stop device on the line 5—5 of Figure 3.

The end plate of the reel is indicated by the numeral 1, being composed of the usual hard rubber facing 2 and the metal backing plate 3, the end plate being recessed on its inner surface to house the various operative parts of the reel. The pillars for the reel structure are shown at 5 and the spool at 6, the latter being secured to the spool shaft 7 which is mounted in a bearing 8 on the end plate.

To the end of the spool is attached the ratchet disk 10, having a flange 11 on the outer surface of which are formed the teeth 12 with which is designed to operate the shiftable, spring operated pawl 14 which forms the click mechanism.

The braking device is designed to cooperate with the inner surface of the flange 11 which forms a brake drum. This device comprises two semi-circular brake shoes 15 which are pivoted at 16 to the end plate. The free ends of the brake shoes are urged together and out of engagement with the flange 11 by a coil spring 18 attached to the ends of the shoes and extending across them. The ends of the brake shoes bear against a spreader or cross piece 22, the construction being so designed that when the spreader is positioned as shown in Figure 2 the shoes are out of contact with the flange and the spool is free of the brake. When the spreader is rotated, the shoes are moved outwardly on their pivots and thereby exert the braking action.

To effect the braking action, the spreader is formed upon a rotary stud or pin 24 which is mounted in the end plate, being provided at its outer end with a squared head or shackle 25 on which is located the brake lever 26 held in place by a headed screw 27. The brake lever extends outwardly to a point beyond the end plate, being provided with an operating plate 29. As the lever is moved from the full line position to the dotted line position of Figure 3, the shoes are spread and the braking action is secured, dependent upon the degree of movement and pressure applied to the brake lever. It will be seen that the construction described gives a very powerful and effective restraint upon the movement of the spool, so much so that by too hasty or too strong operation upon the brake lever, it is possible to break the line when a powerful pull is exerted thereon.

It has been found advisable, therefore, to combine with this brake mechanism an adjustable stop device to limit the extent of movement and the degree of braking force exertable by the brake lever.

The device which has been perfected for this purpose comprises a shiftable stop pin located near the brake lever and in its path of movement, the position of the pin being adjustable toward and from the brake lever as shown.

The end plate is recessed at 30 and in this recess is seated a disk 31 rotatably held by a headed screw 32 which is engaged in a bushing 34 set in the end plate. The face of the disk is flush with the surface of the end plate and is provided with a projection, shown as a pin or stud 35, which projects outwardly therefrom in the path of the lever 26. As the disk is rotated, the pin will be moved in an orbit to different distances from the side of the brake lever in off-position. The movement of the brake lever is stopped by contact with the pin, the degree of movement permitted being controlled by the location of the disk.

The disk is graduated, as shown in Figure 3, so as to afford a means for gaging the amount of braking force which can be exerted, a fixed point being marked on the end plate by which it can be set. The disk is frictionally held in position and in order to increase the friction between the parts the base of the recess 30 may be concaved slightly, as shown in Figure 5, so that the disk may be distorted slightly by tightening the screw 32 to grip and hold the disk in position.

It will be seen that a simple and effective combination has been provided by which the amount of pressure exerted by the brake may be adjusted to suit the requirements of the fisherman. The device consists, broadly, of a pivoted brake lever movable in an arc in which is located the shiftable stop device, and that the preferred form of the invention consists in mounting the stop in a rotatable disk, graduated if desired, located in the arc of travel of the brake lever.

What is claimed is:

1. A brake mechanism for fishing reels comprising a pivoted brake lever, a brake mechanism operated thereby, and a stop device having a range of orbital movement permitting adjustment of the stop anywhere within said range toward and away from the brake lever in non-braking position.

2. A brake mechanism for fishing reels comprising a pivoted brake lever, a brake mechanism operated thereby, a rotatable disk located within the path of movement of the brake lever, and a projection located eccentrically of the disk and extending to a point to intercept the brake lever.

3. In a fishing reel, an end plate, a spool in the end plate, a brake mechanism operative upon the spool, a brake lever connected to the said mechanism and movable over the outside of the end plate, the end plate having a recess, a disk seated in the recess and flush with the surface of the end plate, and a projection on the disk located in the path of the brake lever, said projection serving as means for moving said disk during the adjustment thereof.

4. A brake mechanism for fishing reels comprising a pivoted brake lever, a brake mechanism operated thereby, a rotatable disk located on the outside of the reel end plate within the path of movement of the brake lever, a projection located eccentrically of the disk and extending to a point to intercept the brake lever, and means to hold the disk frictionally in any rotative position.

5. A brake mechanism for fishing reels comprising a pivoted brake lever, a brake mechanism operated thereby, a rotatable disk located within the path of movement of the brake lever, a projection located eccentrically of the disk and extending to a point to intercept the brake lever, means to hold the disk frictionally in any rotative position, and a scale located upon the disk adapted to cooperate with a fixed point on the reel.

6. In a fishing reel, the combination of a spool, an expanding brake adapted to cooperate therewith, a brake lever on the outside of the end of the reel, said lever operating to expand the brake, and a stop located in the path of movement of the lever, said stop being movable in an orbit to limit the movement of the lever to varying extents.

7. In a fishing reel, the combination of a reel end plate, a spool mounted therein, a brake drum on the spool, expanding brake shoes on the end plate and located within the drum, a pivoted lever on the outside of the end plate having means thereon to expand the shoes, and a stop located on the outside of the end plate and movable in an orbit in the path of movement of the lever to limit the expansion of the brake.

8. In a fishing reel, the combination of a reel end plate, a spool mounted therein, a brake drum on the spool, expanding brake shoes on the end plate and located within the drum, a pivoted lever on the end plate having means thereon to expand the shoes, a rotatable disk located within the path of movement of the brake lever, a projection located eccentrically of the disk and extending to a point to intercept the brake lever, means to hold the disk frictionally in any rotative position, and a scale located upon the disk adapted to cooperate with a fixed point on the reel.

9. In a fishing reel, the combination of a reel end plate, a spool mounted therein, a brake drum on the spool, expanding brake shoes on the end plate and located within the drum, a pivoted shoe operating lever on the outside of the end plate, a disk located on the outside of the end plate in the path of the lever, and a stop projecting eccentrically of the disk.

10. In a fishing reel, the combination of a reel end plate, a spool mounted therein, a brake drum on the spool, expanding brake shoes on the end plate and located within the drum, a pivoted shoe operating lever on the end plate, a disk located on the end plate in the path of the lever, a stop projecting eccentrically of the disk, and means for frictionally holding the disk in any angular position.

11. In a fishing reel, the combination of a reel end plate, a spool mounted therein, a brake drum on the spool, expanding brake shoes on the end plate and located within the drum, a pivoted shoe operating lever on the end plate, a disk located on the end plate in the path of the lever, a stop projecting eccentrically of the disk, means for frictionally holding the disk in any angular position, and a scale on the disk adapted to cooperate with a fixed point on the end plate.

12. In a fishing reel, the combination of a reel end plate, a spool mounted therein, a brake drum on the spool, expanding brake shoes on the end plate and located within the drum, a shoe operating device on the outside of the end plate, and an adjustable stop on the outside of the end plate to limit the movement of said device, said stop comprising a rotatable disk and a stop projecting eccentrically from the disk in the path of movement of the device.

13. In a fishing reel, the combination of a reel end plate, a spool mounted therein, a brake drum on the spool, expanding brake shoes on the end plate and located within the drum, a shoe operating device on the end plate, and an adjustable stop on the end plate to limit the movement of said device, said stop comprising a rotatable disk, a pin projecting eccentrically from the disk in the path of movement of the device and frictional means for holding the disk in any angular position, said means comprising a concave seat for said disk, and screw means for adjustably and pivotally securing said disk in said seat.

CHARLES T. PFLUEGER.
WALTER L. ADAMS.